US011724935B2

(12) United States Patent
Gonfard et al.

(10) Patent No.: US 11,724,935 B2
(45) Date of Patent: Aug. 15, 2023

(54) DEVICE FOR GENERATING A GAS

(71) Applicant: SAFRAN ELECTRONICS & DEFENSE, Paris (FR)

(72) Inventors: Romain Gonfard, Moissy-Cramayel (FR); Axel Moskala, Moissy-Cramayel (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 17/635,914

(22) PCT Filed: Aug. 26, 2020

(86) PCT No.: PCT/EP2020/073902
§ 371 (c)(1),
(2) Date: Feb. 16, 2022

(87) PCT Pub. No.: WO2021/037939
PCT Pub. Date: Mar. 4, 2021

(65) Prior Publication Data
US 2022/0363536 A1 Nov. 17, 2022

(30) Foreign Application Priority Data

Aug. 30, 2019 (FR) ...................................... 1909603

(51) Int. Cl.
*C01B 3/06* (2006.01)
(52) U.S. Cl.
CPC ...... *C01B 3/065* (2013.01); *C01B 2203/1052* (2013.01); *C01B 2203/169* (2013.01)

(58) Field of Classification Search
CPC ............ C01B 3/065; C01B 2203/1052; C01B 2203/169; Y02E 60/36; Y02E 60/50; B01J 7/02
See application file for complete search history.

(56) References Cited

U.S. PATENT DOCUMENTS

2011/0212374 A1* 9/2011 Rosenzweig ..... H01M 8/04216
429/421
2013/0295002 A1 11/2013 Marsh et al.

FOREIGN PATENT DOCUMENTS

| CN | 107790134 A | 3/2018 |
| FR | 3072303 A1 | 4/2019 |
| FR | 3072304 A1 | 4/2019 |
| WO | WO2010051557 A1 | 5/2010 |

* cited by examiner

*Primary Examiner* — Steven J Bos
*Assistant Examiner* — Syed T Iqbal
(74) *Attorney, Agent, or Firm* — Muncy, Geissler, Olds & Lowe, P.C.

(57) ABSTRACT

A device for generating a gas by putting a liquid into contact with a catalyst includes an enclosure defining a first chamber for containing the liquid and a second chamber for containing the catalyst. A valve member is mounted to move inside the enclosure between a closed position in which the first chamber and the second chamber are isolated from each other and an open position in which the first chamber and the second chamber are in fluid-flow communication. Accordingly, the valve member is connected to an elastically-deformable diaphragm forming a wall of the enclosure. The diaphragm is coupled to an actuator arranged outside the enclosure to deform said diaphragm in such a manner as to move the valve member between the closed position and the open position.

11 Claims, 2 Drawing Sheets

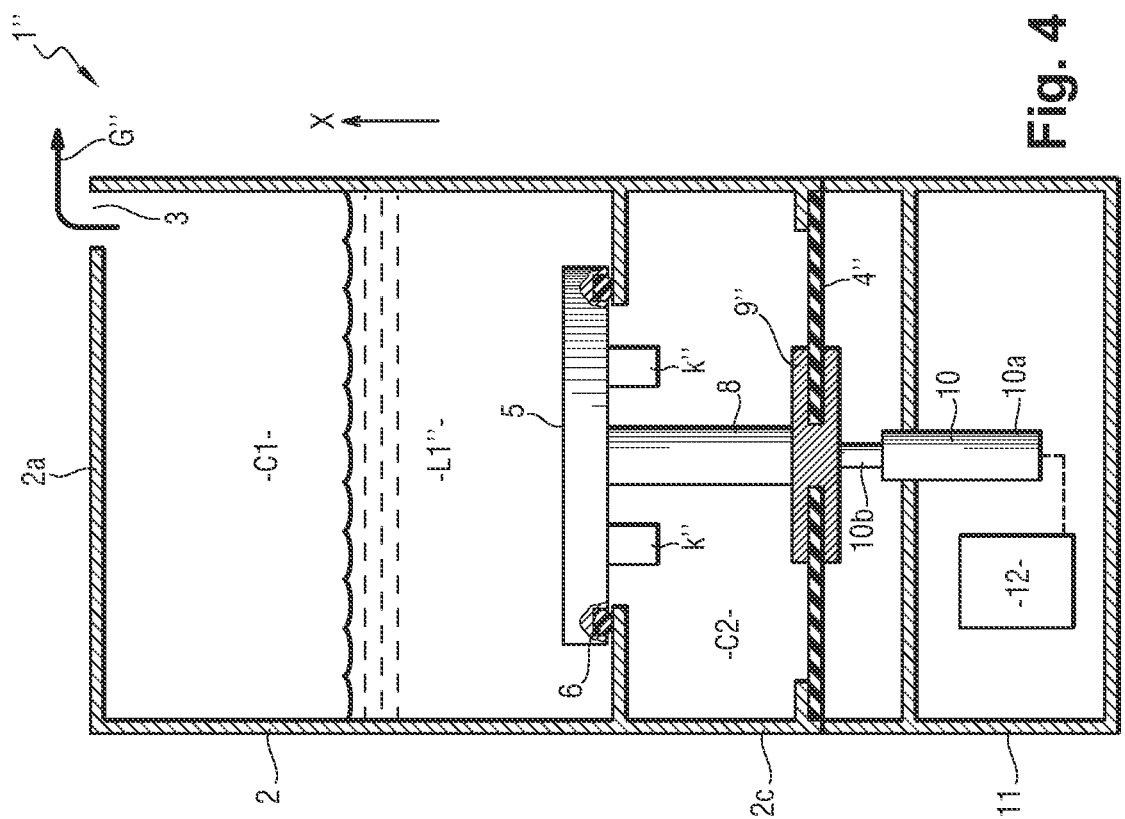
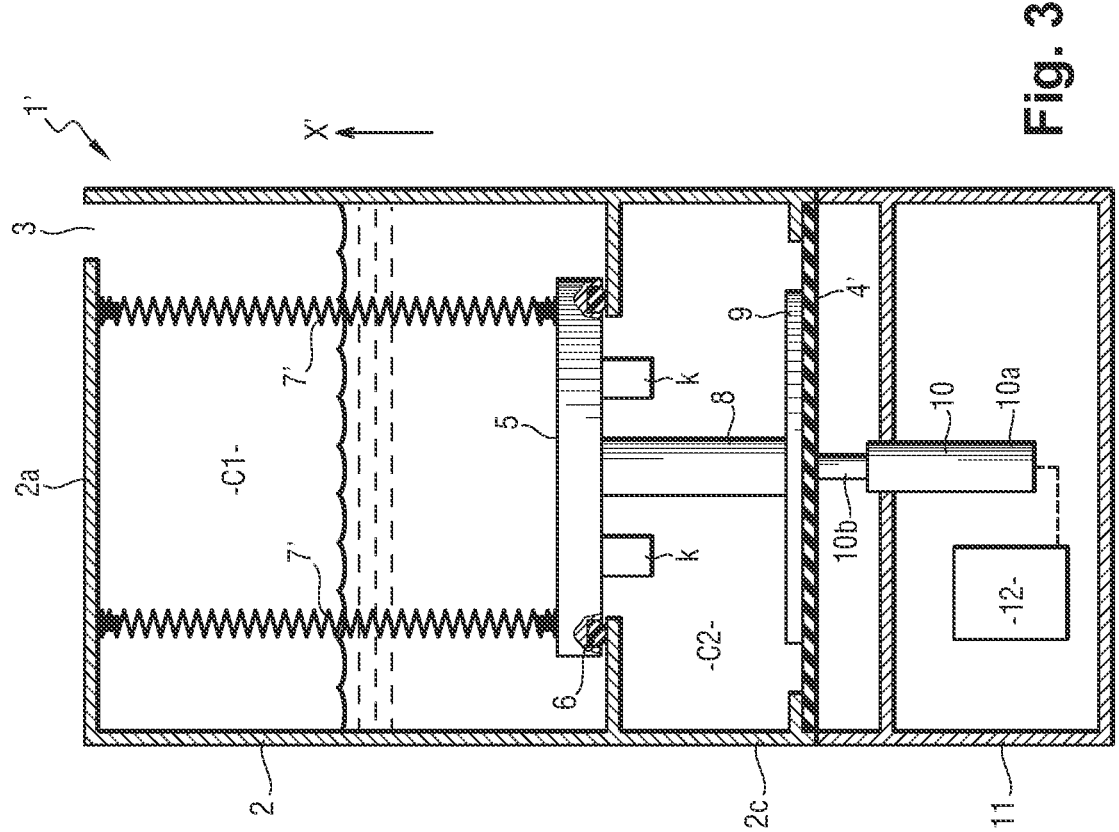

DEVICE FOR GENERATING A GAS

The present invention relates to a device for generating a gas, particularly, but not exclusively, for generating dihydrogen by putting a liquid into contact with a catalyst.

BACKGROUND OF THE INVENTION

In an environmental context promoting the production of clean energy, hydrogen appears as a promising energy vector that is capable, by means of a fuel cell, of supplying electricity in a variety of mobile applications.

One well-known method of producing hydrogen consists in putting an aqueous solution of a chemical hydride in contact with a catalyst in order to give rise to a hydrolysis reaction of the hydride, thereby producing dihydrogen.

Devices are known that perform such catalytic hydrolysis of a hydride. Conventionally, they comprise an enclosure defining an inside volume containing the aqueous hydride solution and a compartment in which the catalyst is housed. The compartment is provided with a lid, and together with said lid it forms a catalysis chamber. The lid is mounted to move in translation between a closed position in which the catalysis chamber is isolated from the inside volume of the enclosure, and an open position in which the catalysis chamber and the inside volume are in fluid-flow communication, such that in the open position, the aqueous hydride solution penetrates into the catalysis chamber and, on contact with the catalyst, generates hydrogen.

An actuator serves to control the position of the lid and thus to control the reaction of hydrolyzing the hydride contained in the enclosure. The actuator comprises a cylinder in which there moves a rod that is connected to the lid. The actuator cylinder passes securely through a hole formed in a wall of the enclosure.

The passage of the actuator through the wall requires very good sealing between the cylinder and said wall of the enclosure, since poor sealing can be detrimental not only to proper operation of the device but also to its safety.

In order to mitigate that sealing problem, proposals have been made to place the actuator inside the enclosure, and more particularly inside the catalysis chamber.

Nevertheless, arranging the actuator in that way makes maintaining the actuator more complicated, or even impossible. What's more, the actuator then needs to operate in an environment that is particularly constraining, both chemically and thermally.

Specifically, the pH of the aqueous hydride solution can be extreme, e.g. as a result of adding a strong base in particular for the purpose of ensuring operation at low temperatures, and depending on the ingredients, the heat given off by the hydrolysis reaction can be exothermic, which can give rise to malfunction of said actuator, or even to its destruction.

OBJECT OF THE INVENTION

An object of the invention is thus to propose a device for generating a gas by putting a liquid into contact with a catalyst, while obviating the above-mentioned drawbacks, at least in part.

SUMMARY OF THE INVENTION

For this purpose, said device comprises an enclosure defining a first chamber for containing the liquid and a second chamber for containing the catalyst. A valve member (e.g. in the shape of a lid) is mounted to move inside the enclosure between a closed position in which the first chamber and the second chamber are isolated from each other and an open position in which the first chamber and the second chamber are in fluid-flow communication.

According to the invention, the valve member is connected to a deformable wall of the enclosure. The wall is coupled to an actuator arranged outside the enclosure to deform said wall in such a manner as to move the valve member between the closed position and the open position.

The indirect coupling between the valve member and the actuator thus makes it possible to avoid any need to manage sealing between the actuator and the enclosure. It also serves to facilitate maintenance of the device, and in particular of the actuator.

Furthermore, since the actuator is not in contact with the liquid, it is not subjected to the chemical and thermal stresses of the gas-generation medium.

In a particular embodiment of the invention, the deformable wall defines at least a portion of a bottom of the enclosure.

In particular manner, the deformable wall defines substantially all of the bottom of the enclosure.

According to a particular characteristic, the deformable wall is made of an elastomer, preferably of the butyl family or of the hydrogenated nitrile family because of their high degrees of chemical resistance and permeability.

According to another particular characteristic, the actuator comprises a cylinder in which a rod is mounted to be movable between a retracted position and a deployed position, with a free end of the rod being coupled to the deformable wall.

Advantageously, the actuator is an electric actuator. Such an actuator enables the position of the rod relative to the cylinder to be known and managed accurately, and thus enables the degree to which the valve member is open to be managed accurately. Furthermore, such an actuator serves to limit the amount of energy that needs to be consumed in order to control the degree to which the valve member is open, since no holding current is needed to keep the actuator in position.

In particular manner, the actuator is secured to a control module that is releasably fastened to the enclosure. Incorporating the actuator in such a control module facilitates recycling and enables the actuator to be re-used with another enclosure.

Advantageously, the control module includes a control unit that is configured to control the actuator.

In particular manner, the liquid is an aqueous solution of sodium borohydride and the catalyst is cobalt based in order to promote the generation of dihydrogen. By way of example, the device can then be used to feed hydrogen to a fuel cell.

BRIEF DESCRIPTION OF THE DRAWINGS

The invention can be better understood in the light of the following description, which description is purely illustrative and nonlimiting, and should be read with reference to the accompanying drawings, in which:

FIG. 3 is a diagrammatic view of a variant of the gas generator device shown in FIG. 1; and FIG. 4 is a diagrammatic view of in a second embodiment of the invention.

DETAILED DESCRIPTION OF THE INVENTION

Figure 1:
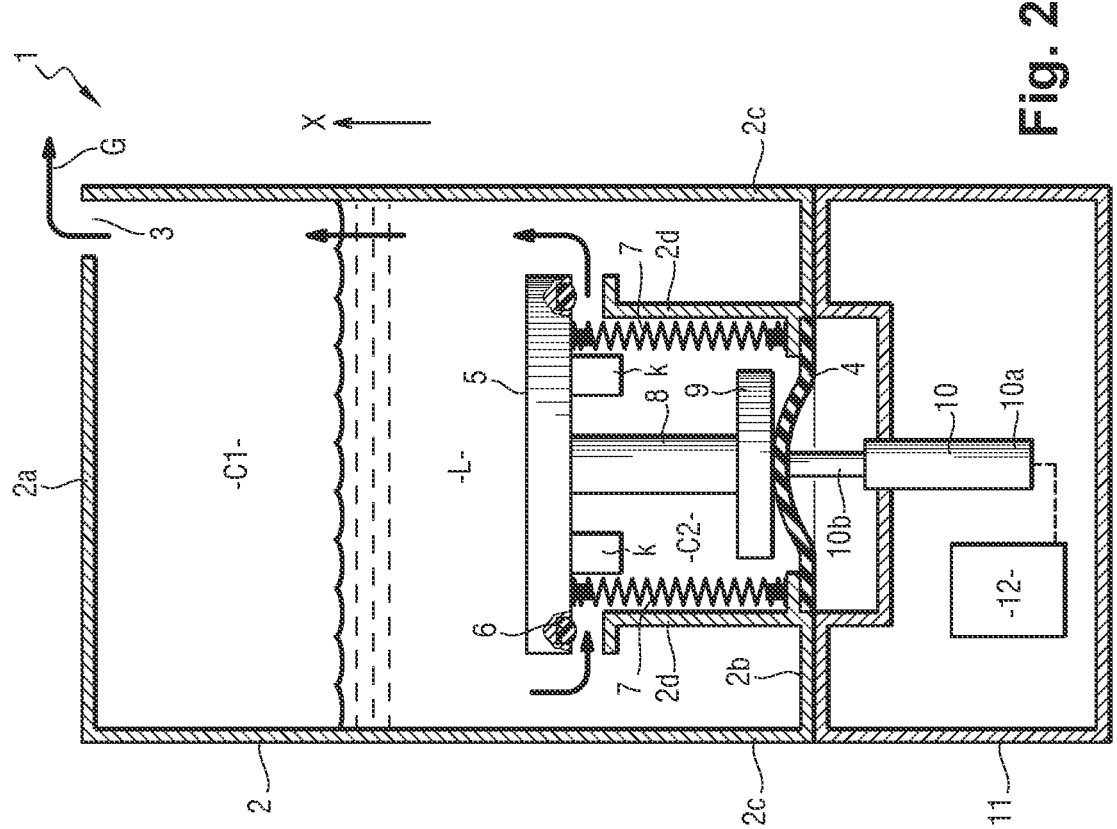
FIG. 1 is a diagrammatic view of a device for generating a gas in a first embodiment of the invention, with the valve member shown in the closed position.

With reference to FIG. 1, a device 1 in a first embodiment of the invention is arranged to produce a gas G by putting a liquid L into contact with a catalyst K. The device comprises an enclosure 2 extending along a vertical axis X. The enclosure 2 has a top wall 2a and a bottom wall 2b that are substantially horizontal and that are connected together by side walls 2c that are substantially vertical.

The top wall 2a as an outlet orifice 3 the gas G, which orifice is for connecting to apparatus that consumes the gas G.

The bottom wall 2b includes an opening that is closed by an elastically-deformable diaphragm 4 that cooperates with said bottom wall 2b to define a bottom of the enclosure 2. By way of example, the diaphragm 4 is made of an elastomer, preferably of the butyl family or of the hydrogenated nitrile family.

The enclosure 2 also includes partitions 2d that project from the bottom of the enclosure 2 all around the diaphragm 4.

The top wall 2a, the side walls 2c, and the partitions 2d together define a first chamber C1 containing the liquid L. The diaphragm 4 and the partitions 2d form a container defining a second chamber C2 referred to as a "catalysis chamber" and housing the catalyst K.

Figure 2:
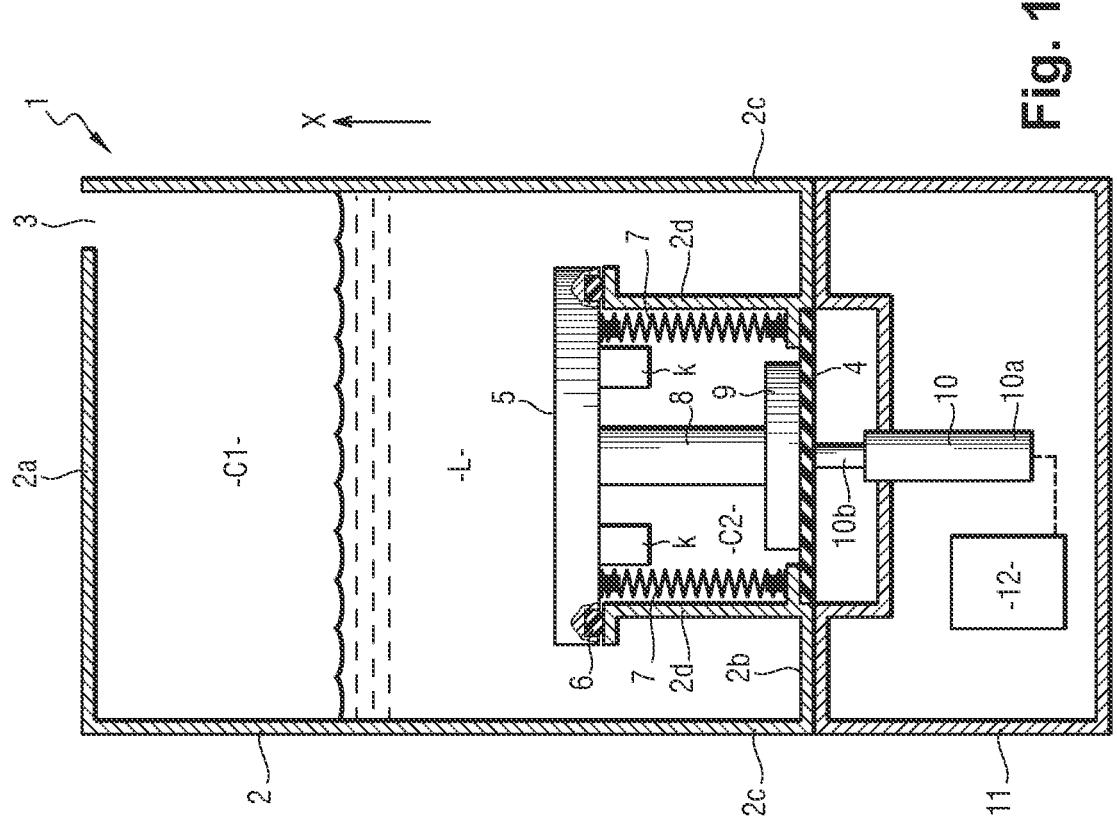
FIG. 2 is a view identical to the view of FIG. 1 in which the valve member is shown in the open position.

A valve member 5 is mounted to move relative to the diaphragm 4 between a closed position in which the first chamber C1 and the second chamber C2 are isolated from each other (FIG. 1) and an open position in which the first chamber C1 and the second chamber C2 are in fluid-flow communication (FIG. 2). The valve member 5 is provided with a sealing gasket 6 that is received in a groove formed at the periphery of said valve member 5 so that, when in the closed position, the sealing gasket 6 comes to bear against free ends of the partitions 2d of the enclosure 2 so as to prevent the liquid L contained in the first chamber C1 from penetrating into the second chamber C2.

The valve member 5 is held in the closed position by traction springs 7 connected to the bottom wall 2b of the enclosure 2 and to a bottom surface of the valve member 5 in order to form a return member.

In this example, the catalyst K is fastened to the bottom surface of the valve member 5 and is in the form of hollow tubes.

The valve member 5 is connected to the diaphragm 4 by means of a tubular body 8 that extends substantially vertically, projecting down from the valve member 5 and having a plate 9 at its end that is arranged to bear against the diaphragm 4 when the valve member 5 is in the closed position.

The diaphragm 4 is coupled to an electric actuator 10 arranged outside the enclosure 2 and extending substantially vertically in register with the plate 9 secured to the valve member 5. The actuator 10 comprises a cylinder 10a secured to a control module 11 that is releasably fastened to the enclosure 2, and a rod 10b mounted to move in the cylinder 10a between a deployed position in which the rod 10b exerts a thrust force against the diaphragm 4 and a retracted position in which the rod 10b is almost separated from the diaphragm 4.

The actuator 10 is electrically connected to a control unit 12 that is arranged inside the control module 11 and that is configured to control the position of the rod 10b relative to the cylinder 10a of said actuator 10.

There follows a description of putting the liquid L into contact with the catalyst K.

When the control unit 12 receives an "open" control signal, it controls the actuator 10 so as to move the rod 10b from the retracted position towards the deployed position. The rod 10b then exerts a thrust force on the diaphragm 4 tending to deform it and, indirectly, tending to move the valve member 5 from the closed position towards the open position, the thrust force being greater than the return forces exerted by the springs 7.

Under such circumstances, the first chamber C1 and the second chamber C2 are in fluid-flow communication with each other. The liquid L contained in the first chamber C1 penetrates into the second chamber C2, and the liquid L coming into contact with the catalyst K causes the gas G to be generated. Under the effect of buoyancy, the gas flows through the liquid L and is discharged via the outlet orifice 3 of the enclosure 2.

Conversely, when the control unit 12 receives a "close" control signal, it controls the actuator 10 so as to move the rod 10b from the deployed position towards the retracted position. The diaphragm 4 then tends to return to its initial shape and the valve member 5 is caused to move from the open position to the closed position under the effect of the return force exerted by the springs 7.

Under such circumstances, the first chamber C1 and the second chamber C2 are once again isolated from each other. The liquid L contained in the first chamber C1 can thus no longer penetrate into the second chamber C2, such that generation of the gas G is stopped.

Advantageously, the outlet orifice of the enclosure 2 may be fitted with a flow rate regulator valve so as to discharge the gas G at a predetermined constant pressure and/or with an overpressure valve so as to allow the gas G to be discharged when the pressure of the gas G inside the enclosure 2 is higher than a predetermined pressure.

By way of example, the actuator 10 may be controlled by the control unit 12 as a function of a comparison between a measurement of the pressure of the gas G inside the enclosure and a predetermined minimum and/or maximum pressure. Thus, when the pressure of the gas G as measured inside the enclosure 2 is higher than the predetermined maximum pressure, the control unit 12 controls the actuator 10 so as to put the valve member 5 in the closed position. Generation of the gas G is then stopped. Conversely, when the pressure of the gas G as measured inside the enclosure 2 is lower than the predetermined minimum pressure, the control unit 12 controls the actuator 10 so as to put the valve member in the open position and thus lead to a new cycle of generating the gas G.

When the liquid L contained in the first chamber C1 of the enclosure 2 is an aqueous solution of sodium borohydride ($NaBH_4$) and when the catalyst housed in the second chamber C2 is based on cobalt, the device 1 enables dihydrogen to be generated in application of the following formula:

$$NaBH_4 + 2H_2O = NaBO_2 + 4H_2.$$

By way of example, the dihydrogen that is produced may be fed to a fuel cell by connecting the fuel cell to the outlet orifice 3 of the enclosure 2.

Other liquids suitable for forming a gas by being put into contact with a catalyst could be contained in the first chamber C1 of the enclosure 2. The catalyst K should then be selected appropriately for promoting generation of the gas.

FIG. 3 shows a device 1' for generating a gas G' by putting a liquid L' into contact with a catalyst K', which device is a variant of the device 1.

The device 1' differs from the device shown in FIGS. 1 and 2 in that the diaphragm of 4' defines substantially all of the bottom of the enclosure 2' and in that the valve member 5 is now held in the closed position by compression springs 7' connecting the top surface of the valve member to the top wall of the enclosure 2.

The operation of the device 1' is similar to that of the device 1.

Thus, when the control unit 12 receives an "open" control signal, it controls the actuator 10 so as to move the rod 10b from the retracted position towards the deployed position. The rod 10b then exerts a thrust force on the diaphragm 4' tending to deform it and, indirectly, tending to move the valve member 5 from the closed position towards the open position, the thrust force being greater than the return forces exerted by the springs 7'.

Under such circumstances, the liquid L' contained in the first chamber C1 penetrates into the second chamber C2, and the liquid L' coming into contact with the catalyst K' causes the gas G' to be generated. Under the effect of buoyancy, the gas G' flows through the liquid L' and is discharged via the outlet orifice 3 of the enclosure 2.

Conversely, when the control unit 12 receives a "close" control signal, it controls the actuator 10 so as to move the rod 10b from the deployed position towards the retracted position. The diaphragm 4' then tends to return to its initial shape and the valve member 5 is caused to move from the open position to the closed position under the effect of the thrust force exerted by the springs 7'.

Under such circumstances, the liquid L' contained in the first chamber C1 can no longer penetrate into the second chamber C2, such that generation of the gas G' is stopped.

FIG. 4 shows a second embodiment of the invention, specifically a device 1" for generating a gas G" by putting a liquid L" in contact with a catalyst K".

The device 1" differs from the device shown in FIG. 3 in that the rod 10b of the actuator 10 is secured to the plate 9", which holds the diaphragm 4" sandwiched in its periphery. Thus, movement of the valve member 5 is now linked directly to movement of the rod 10b of the actuator 10, such that there is no longer any need to have springs for holding the valve member 5 in the closed position.

In a variant, the diaphragm of 4" may also be designed to present elastic properties enabling it to perform the return-spring function.

Nevertheless, the operation of the device 1" remains substantially similar to the operation of the devices 1 and 1'.

When the control unit 12 receives an "open" control signal, it controls the actuator 10 so as to move the rod 10b from the retracted position towards the deployed position, thereby simultaneously causing the plate 9" to move, tending to deform the diaphragm 4" and to take the valve member 5 from the closed position to the open position.

Under such circumstances, the liquid L" contained in the first chamber C1 penetrates into the second chamber C2, and the liquid L" coming into contact with the catalyst K" causes the gas G" to be generated. Under the effect of buoyancy, the gas G" flows through the liquid L" and is discharged via the outlet orifice 3 of the enclosure 2.

Conversely, when the control unit 12 receives a "close" control signal, it controls the actuator 10 so as to move the rod 10b from the deployed position towards the retracted position. Under the effect of the movement of the plate 9", the diaphragm of 4" tends to return to its initial shape, and the valve member 5 goes from the open position to the closed position.

Under such circumstances, the liquid L" contained in the first chamber C1 can thus no longer penetrate into the second chamber C2, such that generation of the gas G" is stopped.

Naturally, the invention is not limited to the implementations described but covers any variant coming within the ambit of the invention as defined by the claims.

In the figures, the various elements of the devices are not necessarily shown to scale or in proportion.

The springs 7, 7' may be replaced by any other traction or return member, e.g. such as magnets.

Although above, the actuator is an electric actuator, it could equally well be hydraulic or pneumatic.

It is naturally possible to envisage other arrangements and shapes for the catalyst K.

The invention claimed is:

1. A device for generating a gas by putting a liquid into contact with a catalyst, the device comprising an enclosure defining a first chamber for containing the liquid and a second chamber for containing the catalyst, a valve member being mounted to move inside the enclosure between a closed position in which the first chamber and the second chamber are isolated from each other and an open position in which the first chamber and the second chamber are in fluid-flow communication, the valve member being connected to an elastically-deformable diaphragm forming a wall of the enclosure and the diaphragm being coupled to an actuator arranged outside the enclosure to deform said diaphragm in such a manner as to move the valve member between the closed position and the open position.

2. The device according to claim 1, wherein the deformable diaphragm defines at least a portion of a bottom of the enclosure.

3. The device according to claim 2, wherein the deformable diaphragm defines all of the bottom of the enclosure.

4. The device according to claim 1, wherein the deformable diaphragm is made of an elastomer.

5. The device according to claim 1, wherein the actuator comprises a cylinder in which a rod is mounted to be movable between a retracted position and a deployed position, with a free end of the rod being coupled to the deformable diaphragm.

6. The device according to claim 5, wherein the actuator is an electric actuator.

7. The device according to claim 1, wherein the actuator is secured to a control module that is releasably fastened to the enclosure.

8. The device according to claim 7, wherein the control module includes a control unit that is configured to control the actuator.

9. The device according to claim 1, wherein the liquid is an aqueous solution of sodium borohydride and wherein the catalyst is cobalt based in order to promote the generation of dihydrogen.

10. A device according to claim 4, wherein the elastomer is of the butyl family.

11. A device according to claim 4, wherein the elastomer is of the hydrogenated nitrile family.

* * * * *